(12) United States Patent
Murayama et al.

(10) Patent No.: US 9,523,421 B2
(45) Date of Patent: Dec. 20, 2016

(54) STRAIN WAVE GEARING

(71) Applicant: HARMONIC DRIVE SYSTEMS INC., Shinagawa-ku (JP)

(72) Inventors: Yuya Murayama, Azumino (JP); Yoshihide Kiyosawa, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 112 days.

(21) Appl. No.: 14/400,358

(22) PCT Filed: Jun. 20, 2013

(86) PCT No.: PCT/JP2013/003876
§ 371 (c)(1),
(2) Date: Nov. 11, 2014

(87) PCT Pub. No.: WO2014/203294
PCT Pub. Date: Dec. 24, 2014

(65) Prior Publication Data
US 2016/0109014 A1   Apr. 21, 2016

(51) Int. Cl.
*F16H 35/00* (2006.01)
*F16H 49/00* (2006.01)

(52) U.S. Cl.
CPC .................. *F16H 49/001* (2013.01)

(58) Field of Classification Search
CPC ...................................... F16H 49/001
USPC ........................................... 74/640
See application file for complete search history.

(56) References Cited

U.S. PATENT DOCUMENTS 6,817,267 B2 * 11/2004 Kobayashi ............ F16H 49/001
                                                            74/640
6,968,755 B2 * 11/2005 Kobayashi .............. F16C 33/60
                                                            74/640
8,991,282 B2 *  3/2015 Yajima .................. F16H 49/001
                                                            74/640
2002/0135241 A1   9/2002 Kobayashi et al.
(Continued)

FOREIGN PATENT DOCUMENTS

JP        02-91240 U     7/1990
JP        02-113048 U    9/1990
(Continued)

OTHER PUBLICATIONS

International Search Report (PCT/ISA/210) mailed on Sep. 17, 2013, by the Japanese Patent Office as the International Searching Authority for International Application No. PCT/JP2013/003876.

*Primary Examiner* — Ha D Ho
(74) *Attorney, Agent, or Firm* — Buchanan Ingersoll & Rooney PC

(57) ABSTRACT

A hollow-type strain wave gearing unit has a cup-shaped flexible externally-toothed gear, in which one shaft end portion of a hollow rotation shaft of a wave generator is located. The shaft end portion is supported by a bearing mounted on a bearing holder fixed to a boss of the flexible externally-toothed gear. The bearing holder has a retainer holding portion to prevent a retainer of a wave generator bearing from coming off in the axis line direction. There is no need to dispose a retainer holding plate of the wave generator bearing inside the flexible externally-toothed gear, whereby the axial length of the hollow-type strain wave gearing unit can be reduced.

4 Claims, 5 Drawing Sheets

(56) References Cited

U.S. PATENT DOCUMENTS

2011/0116962 A1  5/2011  Kanayama

FOREIGN PATENT DOCUMENTS

| JP | 2002-243000 A | 8/2002 |
|---|---|---|
| WO | WO 2010/089796 A1 | 8/2010 |

* cited by examiner

STRAIN WAVE GEARING

TECHNICAL FIELD

The present invention relates to a strain wave gearing which is short in the axial length and is provided with a cup-shaped flexible externally-toothed gear, and in particular, to a hollow-type strain wave gearing which is short in the axial length and is provided with a unit hollow portion passing through in the axial direction.

BACKGROUND ART

As a hollow-type strain wave gearing provided with a unit hollow portion passing therethrough in the axial direction, there is known one that is provided with a cup-shaped flexible externally-toothed gear. Patent Document 1 discloses an actuator configured so that a hollow-type strain wave reduction gearing and a hollow motor are integrally connected in the axial direction.

A wave generator of the hollow-type strain wave reduction gearing has an elliptically-contoured cam plate (plug) integrally formed on the outer peripheral surface portion of a hollow rotation shaft positioned inside the flexible externally-toothed gear, and a wave bearing (wave generator bearing) mounted on the elliptical outer peripheral surface of the cam plate. The rotation shaft is formed integrally with an annular retainer holding plate on a position adjacent to the cam plate forming portion of the rotation shaft. The retainer of the wave bearing is prevented from coining off in the rotation center axis line by the retainer holding plate. Further, the shaft end portion of the rotation shaft positioned on the boss side of the flexible externally-toothed gear is supported from outer peripheral side by a bearing mounted on the bearing holder attached to the boss.

PRIOR ART DOCUMENT

Patent Document

[Patent Document 1] JP 2002-243000A

SUMMARY OF THE INVENTION

Problems to be Solved by the Invention

Here, there is a case in which a flat strain wave gearing having a short axial length is required for the strain wave gearing provided with a cup-shaped flexible externally-toothed gear. In the strain wave reduction gearing disclosed in Patent document 1, the shaft end portion of the wave generator (the shaft end portion of the rotation shaft) positioned inside the flexible externally-toothed gear is supported by the bearing mounted on the bearing holder fixed to the boss of the flexible externally-toothed gear as mentioned above. Since the bearing holder and the bearing, the retainer holding plate, and the wave generator are arranged in the axis line direction inside the flexible externally-toothed gear, there is a limit on reducing the axial length.

It is conceivable that, as a retainer, such a type of retainer that do not requires a retainer holding member is used to avoid installation of the retainer holding member. In this case, however, the width of the retainer in the axis direction is large and, by that amount, the axial length of the strain wave gearing becomes large. Therefore, it is difficult to reduce the axial length.

In view of the above, an object of the present invention is to provide a strain wave gearing provided with a cup-shaped flexible externally-toothed gear and is short in the axial length.

Means to Solve the Problems

In order to solve the above problems, a strain wave gearing of the present invention comprises:
a rigid internally-toothed gear;
a cup-shaped flexible externally-toothed gear arranged inside the rigid internally-toothed gear, and capable of meshing with the rigid internally-toothed gear;
a wave generator disposed inside the flexible externally-toothed gear and flexes the flexible externally-toothed gear into an ellipsoidal shape to mesh partially with the rigid internally-toothed gear;
a boss defining a center portion of a cup bottom of the flexible externally-toothed gear;
a bearing holder arranged inside the flexible externally-toothed gear and fixed to the boss;
a boss side bearing that is mounted on the bearing holder, and that supports a shaft end portion of the wave generator located on a side of the boss in a freely rotating state from an outer peripheral side; and
a retainer holding portion that is formed on a holder end face of the bearing holder facing a side of the wave generator, and that faces, with a prescribed gap, a retainer of a wave generator bearing of the wave generator.

In the strain wave gearing of the present invention, the shaft end portion located insider the cup-shaped flexible externally-toothed gear is supported by the boss side bearing mounted on the bearing holder fixed to the boss of the flexible externally-toothed gear. Further, the bearing holder is formed on the holder end face thereof with the retainer holding portion and functions as the retainer holding member for the wave generator bearing. Therefore, there is no need to dispose the retainer holding plate of the way generator bearing inside the flexible externally-toothed gear, whereby the axial length of the strain wave gearing can be reduced.

The present invention can be applied to a hollow-type strain wave gearing having a device hollow portion passing therethrough in the device axis direction. In this case of strain wave gearing,
the wave generator has a hollow rotation shaft, a plug integrally formed on an outer peripheral surface of the hollow rotation shaft, and the wave generator bearing mounted on an ellipsoidal outer peripheral surface of the plug,
the shaft end of the wave generator is a boss side shaft end portion of the hollow rotation shaft located on a side of the boss,
the boss of the flexible externally-toothed gear is an annular boss,
the bearing holder has an annular boss fixing portion fixed to a center through hole of the boss, and
a center through hole of the boss fixing portion and a hollow section of the hollow rotation shaft are arranged coaxially to define a device hollow portion passing through in a device axis direction.

Where the strain wave gearing of the present invention is used as a strain wave gearing unit, it comprises:
a first end plate fixed to the rigid internally-toothed gear;
a second end plate fixed to an outer peripheral surface of the boss of the flexible externally-toothed gear;

a device bearing for supporting the rigid internally-toothed gear and the second end plate in a relatively rotatable state; and a bearing that is mounted on an inner peripheral surface of a center through hole formed in the first end plate, and that supports a shaft end portion of the hollow rotation shaft on a side opposite to the boss side shaft end portion in a freely rotation state from outer peripheral side.

In this case, in the consideration of reduction in number of assembled parts and in assembling steps and the like, it is desirable that the rigid internally-toothed gear and the first end plate are formed as a single component part, and that one of the races of the device bearing and the second end plate are formed as a single component part. The rigid internally-toothed gear, the first end plate, and the other race of the device bearing may be formed as a single component part.

MODE FOR CARRYING OUT THE INVENTION

Figure 1:
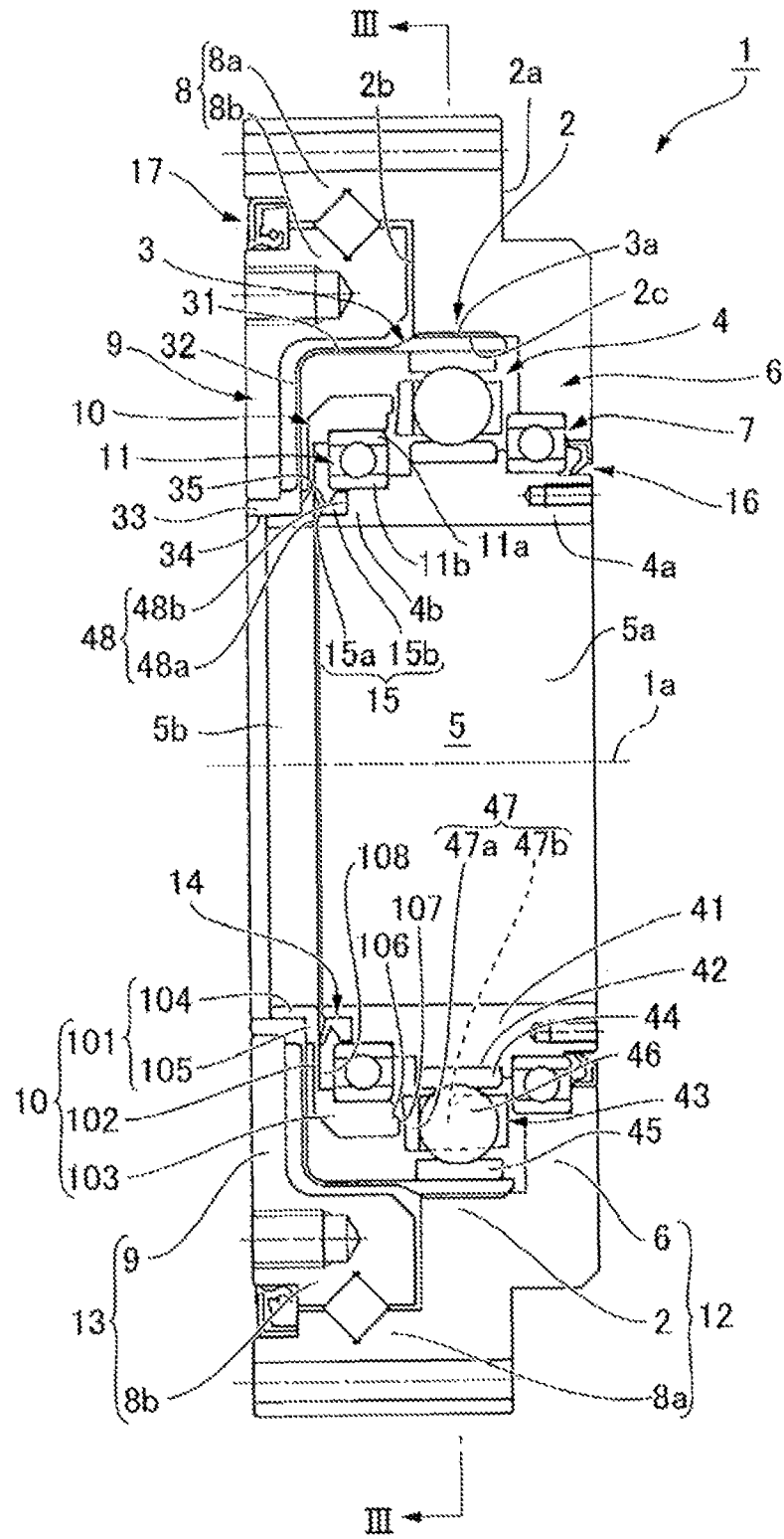
FIG. 1 is a longitudinal sectional view of a hollow-type strain wave gearing unit of the present invention.
Figure 2:
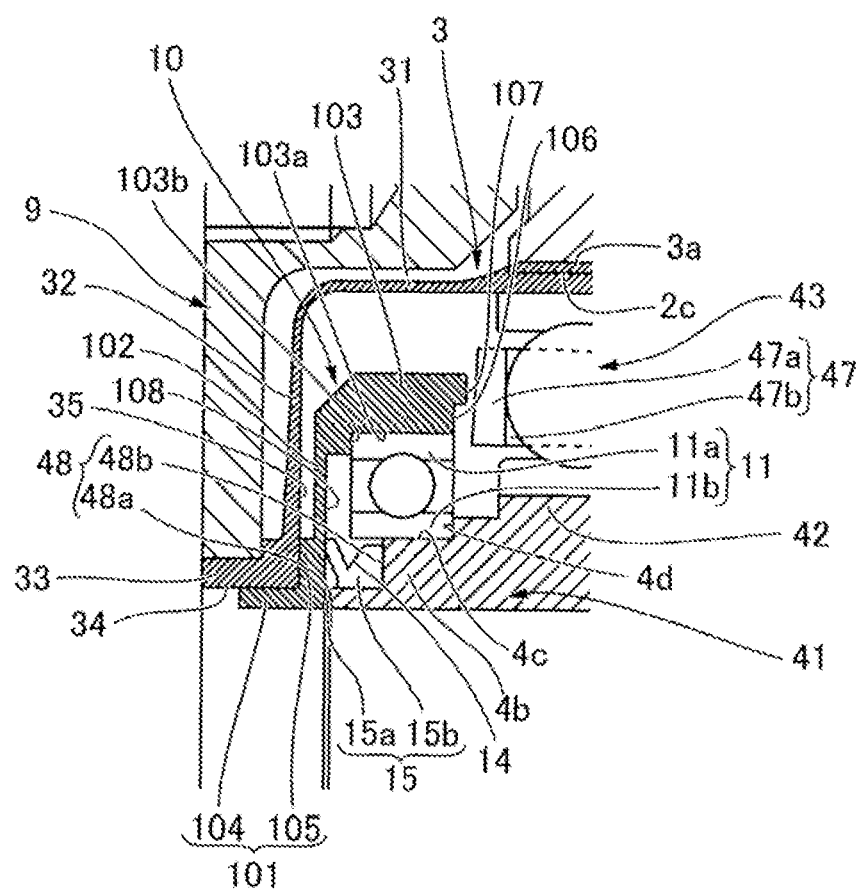
FIG. 2 is a partially enlarged sectional view showing a part of FIG. 1 in an enlarged manner.
Figure 3:
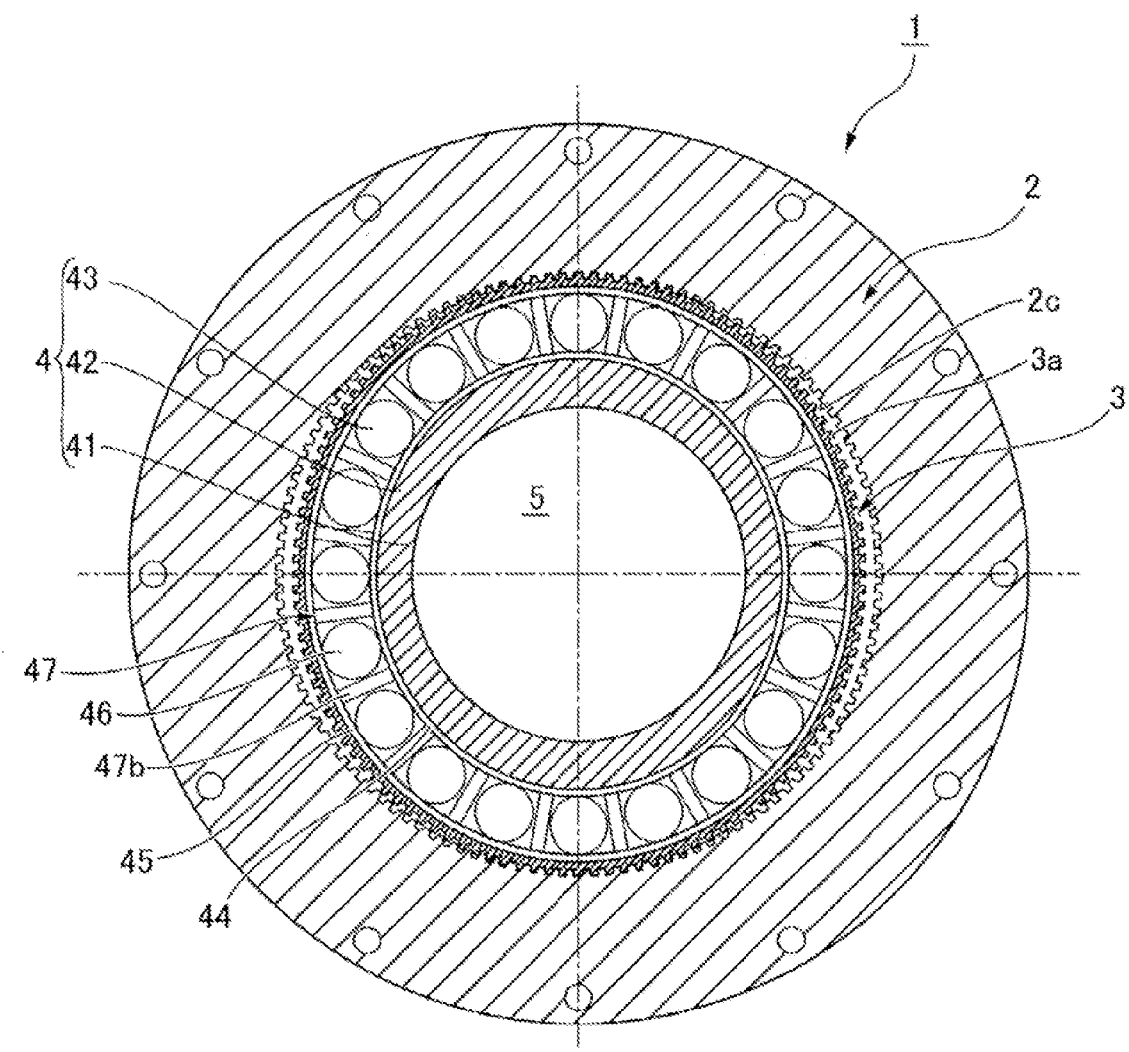
FIG. 3 is a cross-sectional view of a portion taken along the line III-III of FIG. 1.

An embodiment of a hollow-type strain wave gearing unit of the present invention will be described with reference to the drawings. FIG. 1 is a longitudinal sectional view of a hollow-type strain wave gearing unit according to the present embodiment, FIG. 2 is a partially enlarged sectional view showing a part of the unit in an enlarged manner, and FIG. 3 is a cross-sectional view of a portion taken along the line III-III of FIG. 1

(Overall Configuration)

A hollow-type strain wave gearing unit 1 (sometimes hereinafter referred to as a "strain wave gearing unit 1") is provided with an annular rigid internally-toothed gear 2 having a rectangular cross-section. A flexible externally-toothed gear 3 of a cup shape is disposed coaxially inside the rigid internally-toothed gear 2. Inside the flexible externally-toothed gear 3, a wave generator 4 is disposed so that it flexes the flexible externally-toothed gear 3 into an ellipsoidal shape to partially mesh with the rigid internally-toothed gear 2. Also, the strain wave gearing unit 1 is formed with a unit hollow portion 5 extending and passing through the center portion of the unit along the direction of the axis line 1a.

The rigid internally-toothed gear 2 has one end face 2a that is formed integrally with a first unit end plate 6 of a disc shape. These portions 2 and 6 may be separate members that are fixedly fastened with each other. The first unit end plate 6 extends in a direction perpendicular to the axis line 1a. A first bearing 7 is attached to the inner peripheral surface or the center through hole of the first unit end plate 6, and the wave generator 4 has a first shaft end portion 4a on one side thereof, the first shaft end portion being rotatably supported by the first bearing 7. On the side of the other end face 2b of the rigid internally-toothed gear 2, a cross roller bearing 8 as a unit bearing is disposed adjacent to the end face.

An outer ring 8a of the cross roller bearing 8 is integrally formed on the end face 2b of the rigid internally-toothed gear 2. These portions 2 and 8a may be separate members that are fixedly fastened together. A second unit end plate 9 is integrally formed on an end face of the inner ring 8b of the cross roller bearing 8, the end face being located on an opposite side to the rigid internally-toothed gear 2. The portions 9 and 8b may be separate members to be fastened together. The second unit end plate 9 extends perpendicular to the axis line 1a and is fixed to the outer peripheral surface of an annular boss 33 of the cup-shaped flexible externally-toothed gear 3, the boss defining the center portion of the cup bottom of the cup-shaped flexible externally-toothed gear.

The flexible externally-toothed gear 3 is provided, on the inside thereof, with a bearing holder 10 fixed to the boss 33 of the flexible externally-toothed gear. A second bearing 11 is held by the bearing holder 10. The second bearing 11 rotatably supports a second shaft end portion 4b at the side of the boss 33 in the wave generator 4.

For example, the rigid internally-toothed gear 2 is fastened to a fixed side member (not shown), the first shaft end portion 4a of the wave generator is connected to a motor shaft or other high rotational-speed shaft (not shown), and the second unit end plate 9 fixed to the flexible externally-toothed gear 3 is fastened to a not-shown driven-side member. In this case, the component in which the rigid internally-toothed gear 2, the first unit end plate 6 and the outer ring 8a of the cross roller bearing 8 are integrally formed, becomes a unit housing 12 on a fixed side of the strain wave gearing unit 1. Whereas, the component in which the inner ring 8b of the cross roller bearing 8 and the second unit end plate 9 are integrally formed, becomes a unit housing 13 on the rotating side of the strain wave gearing unit 1.

When the wave generator 4 is rotated, the meshing position of the external teeth 3a of the flexible externally toothed gear 3 with the internal teeth 2c of the rigid internally-toothed gear 2 is moved in the circumferential direction. The number of teeth of the flexible externally-toothed gear 3 is 2n (n is a positive integer) less than that of the rigid internally-toothed gear 2, and is usually 2 (n=1) less. Thus, when the meshing position is moved in the circumferential direction, relative rotation in accordance with the difference in the number of teeth occurs between the two gears 2 and 3. A reduced-speed rotation that is reduced in speed according to the difference in the number of teeth is output to the not-shown driven side member, via the second unit end plate 9 from the flexible externally-toothed gear 3.

The structure of each component will be described in more detail. First, the wave generator 4 has a hollow rotation shaft 41, an ellipsoidal-contoured plug 42 of a fixed width integrally formed on the outer peripheral surface of the hollow rotation shaft 4, and a wave generator bearing 43 mounted on the ellipsoidal outer peripheral surface of the plug 42. The hollow part of the hollow rotation shaft 41 defines a wave generator side hollow part 5a of a circular cross section extending in the direction of the axis line 1a and passing through the wave generator 4. Also, one of the shaft end portions of the hollow rotation shaft 41 is the first shaft end portion 4a of the wave generator 4, and the other shaft end portion is the second shaft end portion 4b of the wave generator 4. The second shaft end portion 4b is a boss side shaft end portion located on the side of the boss 33 of the flexible externally-toothed gear 3.

The wave generator bearing 43 has an inner ring 44 and an outer ring 45, both being flexible in the radial direction. An annular raceway is formed between the inner and outer rings 44, 45, and a plurality of balls 46 are inserted therein in a freely rolling state. Balls 46 are held at constant angular intervals in the circumferential direction by an annular retainer 47. The retainer 47 has an annular plate 47a, and a partition plate 47b extending perpendicularly (in the direction of the axis line 1a) from the end face of the annular plate 47a at fixed angular intervals. Between the adjacent partition plates 47b, pockets of the ball 46s are formed. The retainer 47 is inserted between the inner and outer rings 44, 45 from the side of the second unit end plate 9 along the direction of the axis line 1a.

The flexible externally-toothed gear 3 has a cylindrical barrel 31 flexible in the radial direction, a disc-shaped diaphragm 32 extending radially and inwardly from one end of the cylindrical barrel 31, and the annular boss 33 formed on the inner peripheral edge of the diaphragm 32. The cylindrical barrel 31 has an opening end on the other side, and external teeth 3a are formed on the outer peripheral surface portion of the opening end. The boss 33 is fixed on the circular inner peripheral surface of the second unit end plate 9 in a state in which no clearance is formed, by means of press-fitting, adhesive, welding or the like. The bearing holder 10 is fixed into the circular center thorough hole of the boss 33 from the side opposite to the second unit end plate 9 in a state in which no clearance is formed by means of press-fitting, adhesive, welding or the like.

(Bearing Holder)

The bearing holder 10 has an annular boss fixing portion 101 (flange), a disc-shaped thin leaf spring portion 102 extending radially and outwardly from the boss fixing portion 101, a cylindrical holder body portion 103 extending in the axis line direction from the outer peripheral edge of the leaf spring portion 102 toward the first unit end plate 6. The boss fixing portion 101 is of an L-shaped cross-sectional shape having insertion portion 104 fixed on the circular inner peripheral surface of the boss 33 and an annular portion 105 extending along the inner-side annular end face 35 of the boss 33. The second bearing 11 is held inside the holder body portion 103. The boss fixing portion 101, the leaf spring portion 102 and the holder body portion 103 are integrally formed as a single component part. The leaf spring portion 102 has a spring characteristic capable of biasing the holder body portion 103 in the direction of the axis line 1a.

As shown in FIG. 2, the holder body portion 103 is formed with a circular inner peripheral surface 103a for mounting an outer ring. On the edge of the circular inner peripheral surface 103a located at the side of the second unit end plate 9, there is formed an outer ring support face 103b which is an annular stepped face having a fixed width and extending perpendicular to the axis line 1a. The outer ring support face 103b is a surface that faces the side of the first unit end plate 6. The outer ring 11a of the second bearing 11 is attached to the circular inner peripheral surface 103a, and the annular end face of the outer ring abuts against the outer ring support face 103b. The leaf spring portion 102 extends in a direction perpendicular to the axis line 1a. Also, the leaf spring portion 102 connects between the end of the holder body portion 103 and the outer peripheral surface of the annular portion 105 of the boss fixing portion 101, the end of the holder body portion being located on the side of the second unit end plate 9 with respect to the outer ring support face 103b.

On the other hand, the hollow rotation shaft 41 is formed, on the circular outer peripheral surface of the second shaft end portion 4b thereof, with a circular outer peripheral surface 4c for mounting the inner ring. The circular outer peripheral surface 4c has an end on the side of the first shaft end portion 4a, and the end is formed with an inner ring support face 4d that is an annular stepped face having a fixed width and extending perpendicular to the axis line 1a. The inner ring support face 4d is a surface that faces the side of the second unit end plate 9. The inner ring 11b of the second bearing 11 is attached to the circular outer peripheral surface 4c, and the annular end face of the inner ring abuts against the inner ring support face 4d.

The leaf spring portion 102 is in a state slightly displaced toward the second unit end plate 9 along the axis line 1a when the second bearing 11 is assembled. A situation is formed in which a preload is being applied on the second bearing 11 in the axis line direction (a direction along which the inner ring 11b is pushed against the inner ring support face 4d) by the elastic recovering force of the leaf spring portion 102 in the axial direction.

Thus, the bearing mechanism for supporting the second shaft end portion 4b of the hollow rotation shaft 41 is constituted by use of the bearing holder 10 provided with the preloading function. It is not necessary to arrange components to preload the second bearing 11. It is possible to constitute the bearing mechanism with the preloading function by using a small number of parts, and to reduce the installation space in the axial direction of the bearing mechanism. With the bearing mechanism of the present example, the axial length of the hollow-type strain wave gearing unit 1 can be reduced.

In addition to the preloading function, the wave generator bearing 43 is provided with a retainer holding function. As can be seen from FIG. 2, the holder body 103 of the bearing holder 10 is provided with an annular holder end face 106 facing the side of the wave generator bearing 43. The holder end face 106 is formed on a position facing the annular plate 47a of the retainer 47 of the wave generator bearing 43 along the direction of the axis line 1a. The portion of the outer peripheral side of the holder end face 106 is formed with an annular projection 107 that protrudes slightly to the side of the retainer 47. The annular projection 107 faces the end face of the annular plate 47a of the retainer 47 with a minute interval.

In case in which the retainer 47 is going to come off between the inner and outer rings 44 and 45, it comes in contact with the annular projections 107. The annular projection thus functions as a retainer holding part. There is no need to arrange a retainer holding plate for the wave generator bearing 47, whereby the axial length of the hollow-type strain wave gearing unit 1 can be reduced.

Figure 4:
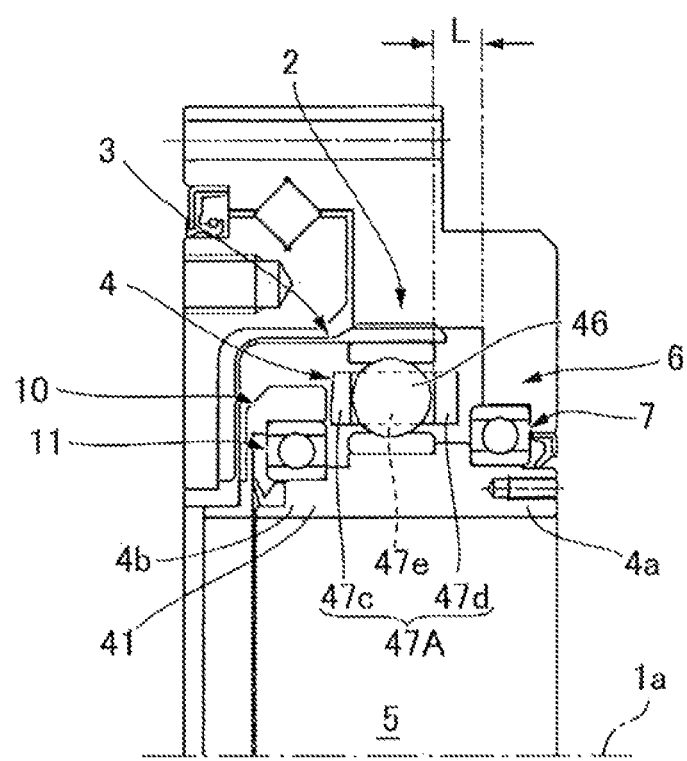
FIG. 4 is a half-sectional view showing the hollow-type strain wave gearing unit provided with a retainer that does not require a retainer holding member.

Here, it is conceivable that the hollow-type strain wave gearing unit 1 is provided with a retainer that does not require a retainer holding plate. As shown in FIG. 4, a retainer 47A in this case is provided with annular plates 47c and 47d positioned on both sides of the balls 46, with partition plates 47e being formed between them. Therefore, in the direction of the axis 1a, it is necessary to secure a space L for arranging the annular plate 47d between the first unit end plate 6 and the wave generator 4. The axial length of the hollow-type strain wave gearing unit 1 becomes large by that amount of the required space L, which is undesirable.

(Sealing Mechanism of the Hollow Portion)

Reference is made again to FIGS. 1 and 2. The unit hollow portion 5 comprises a wave generator side hollow part 5a and a boss side hollow part 5b, in which the wave generator side hollow part is defined by the hollow portion of the hollow rotation shaft 41 of the wave generator 4, and the boss side hollow part is defined by a center through hole of the insertion portion 104 of the bearing holder 10 fixed to the boss 33 of the flexible externally-toothed gear 3. Thus, an annular gap is formed in the inner peripheral surface of the unit hollow portion 5. The gap is sealed by an annular sealing member 14 having a V-shaped cross section.

The sealing member 14 is assembled in the gap 15 formed between the second shaft end portion 4b of the wave generator 4 and the boss fixing portion 101 of the bearing holder 10. The gap 15 includes an annular gap section 15a of a minute width which opens the circular inner peripheral surface of the unit hollow portion 5, and an annular gap section 15b of a wide width which is formed on the outer peripheral side of the gap section 15a. The annular sealing member 14 is fitted in the gap section 15b. With this, the gap 15 is sealed so that lubricating oil or the like is prevented from leaking to the unit hollow portion 5.

The gap 15 with the narrow gap section 15a and the wide gap section 15b is formed in the following manner. An end face portion 108 (boss side end face) of the bearing holder 10 faces the side of the wave generator 4 and is a flat end face perpendicular to the axis line 1a. An end face of the wave generator 4 on the side facing the end face portion 108 is a shaft end face 48 of the second shaft end portion 4b. The shaft end face 48 includes an annular inner peripheral side end face 48a, and an annular outer peripheral end face 48b which is set back toward the direction of the axis line 1a from the inner side peripheral end face 48a with respect to the end face portion 108 of the bearing holder 10. The wide annular gap section 15b is defined between the outer peripheral end face 48b and the end face portion 108 of the bearing holder 10, while the narrow gap section 15a is defined between the inner side end face 48a located on the inner side and the end face portion 108.

Thus, the shaft end face 48 of the second shaft end portion 4b of the hollow rotation shaft 41 is formed in a stepped shape, and the outer end face 48b is set back in the direction of the axis line 1a with respect to the inner peripheral side end face 48a. With this, the wide gap section 15b is defined between the outer peripheral side end surface 48b and the end face portion 108 of the bearing holder 10 on the side facing the outer peripheral side end face 48b. Therefore, it is possible that the sealing member 14 is disposed between the hollow rotation shaft 41 of the wave generator and the boss fixing part 101 along the direction of the axial line 1a.

Figure 5:
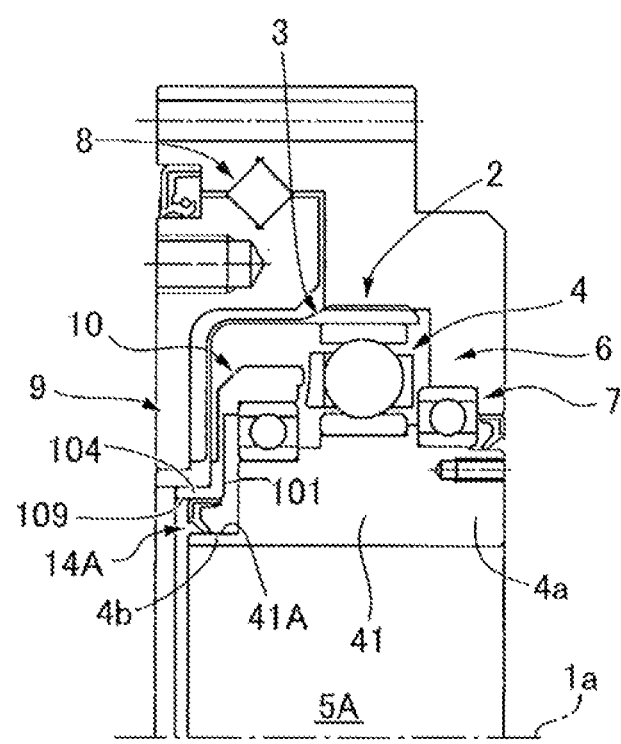
FIG. 5 is a half-sectional view showing a hollow-type strain wave gearing unit in which a sealing member is arranged in the radial direction.

Here, as shown in FIG. 5, it is conceivable that a sealing member 14A is disposed between the inner peripheral surface 109 of the insertion portion 104 of the boss fixing portion 101 and the outer peripheral surface portion 41A of the shaft end portion 4b of the hollow rotation shaft 41, the insertion portion being inserted into the inner peripheral surface 109. Namely, the sealing member 14A is disposed in the radial direction between the insertion portion 104 of the boss fixing portion 101 and the shaft end portion 4b of the hollow rotation shaft 41 on the wave generator side. When the sealing member 14A is disposed in the radial direction, the inner diameter of a unit hollow portion 5A is restricted by the hollow diameter of the hollow rotation shaft 41 that is inserted into the insertion portion 104 of the boss fixing portion 101. This configuration is not suitable for providing a unit hollow portion of a large inner diameter. In contrast, according to the strain wave gearing unit 1 of the present example as shown in FIGS. 1 to 3, it is possible to eliminate such an adverse effect, and the unit hollow portion 5 of the large inner diameter can be made.

Also, in this example, as shown in FIGS. 1 and 2, a gap section 15b for assembling the sealing member is formed so that the gap section 15b enters the inside of the inner ring 11b of the second bearing 11. Thus, the sealing member 14 can be arranged while the unit axial length is maintained similarly as in the case of arranging the sealing member 14 in the radial direction shown in FIG. 5. Therefore, according to this example, it is possible to realize a hollow-type strain wave gearing unit 1 having a large hollow portion and a short axial length by using the cup-shaped flexible externally-toothed gear 3.

In the present example, as shown in FIG. 1, the gap between the outer peripheral surface of the first shaft end portion 4a and the inner peripheral surface of the first unit end plate 6 is sealed by means of a first oil seal 16 which is attached to the position outer side of the first bearing 7. The gap on the side of the second unit end plate 9 between the inner ring 8b and the outer ring 8a of the cross roller bearing 8 is sealed by an annular second oil seal 17.

The invention claimed is:

1. A strain wave gearing, comprising:
    a rigid internally-toothed gear;
    a cup-shaped flexible externally-toothed gear arranged inside the rigid internally-toothed gear, and capable of meshing with the rigid internally-toothed gear;
    a wave generator disposed inside the flexible externally-toothed gear and flexes the flexible externally-toothed gear into an ellipsoidal shape to mesh partially with the rigid internally-toothed gear;
    a boss defining a center portion of a cup bottom of the flexible externally-toothed gear;
    a bearing holder arranged inside the flexible externally-toothed gear and fixed to the boss;
    a boss side bearing that is mounted on the bearing holder, and that supports a shaft end portion of the wave generator located on a side of the boss in a freely rotating state from an outer peripheral side; and
    a retainer holding portion that is formed on a holder end face of the bearing holder facing a side of the wave generator, and that faces, with a prescribed gap, a retainer of a wave generator bearing of the wave generator so as to prevent the retainer from coming off in an axial line direction of the wave generator.

2. The strain wave gearing according to claim 1, wherein
    the wave generator has a hollow rotation shaft, a plug integrally formed on an outer peripheral surface of the hollow rotation shaft, and the wave generator bearing mounted on an ellipsoidal outer peripheral surface of the plug,
    the shaft end portion of the wave generator is a boss side shaft end portion of the hollow rotation shaft located on a side of the boss,
    the boss of the flexible externally-toothed gear is an annular boss,
    the bearing holder has an annular boss fixing portion fixed to a center through hole of the boss, and
    a center through hole of the boss fixing portion and a hollow section of the hollow rotation shaft are arranged coaxially to define a device hollow portion passing through in a device axis line direction.

3. The strain wave gearing according to claim 2, wherein
    a first end plate fixed to the rigid internally-toothed gear;
    a second end plate fixed to an outer peripheral surface of the boss of the flexible externally-toothed gear;
    a device bearing for supporting the rigid internally-toothed gear and the second end plate in a relatively rotatable state; and
    a bearing that is mounted on an inner peripheral surface of a center through hole formed in the first end plate, and that supports a shaft end portion of the hollow rotation shaft on a side opposite to the boss side shaft end portion in a freely rotating state from an outer peripheral side.

4. The strain wave gearing according to claim 3, wherein the rigid internally-toothed gear and the first end plate are formed as a single component part, and
one of races of the device bearing and the second end plate are formed as a single component part.

* * * * *